Dec. 29, 1964     H. SIMONS     3,163,515
GLASS BENDING APPARATUS
Filed Oct. 13, 1959     2 Sheets-Sheet 1
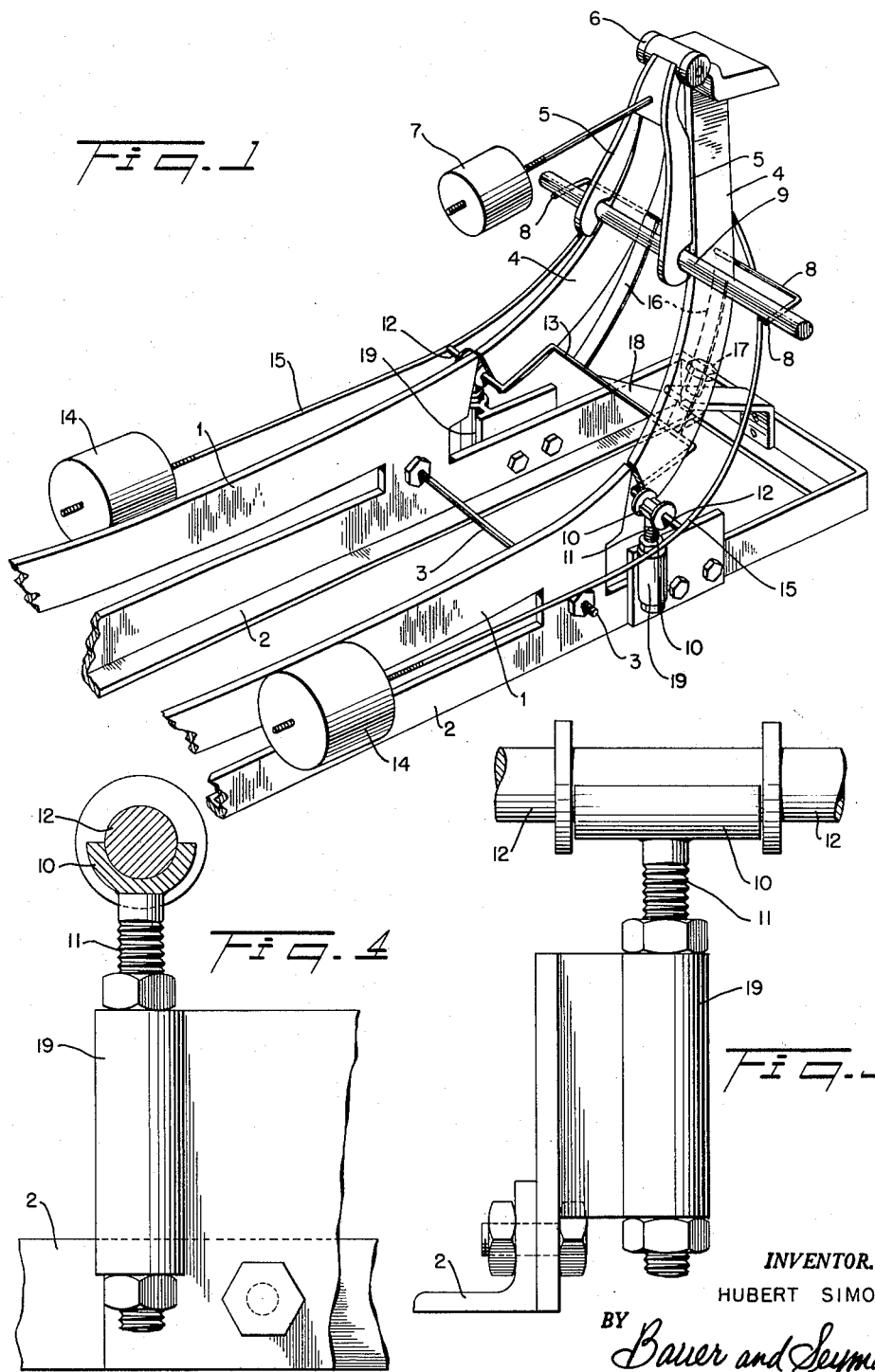
INVENTOR.
HUBERT SIMONS
BY *Bauer and Seymour*
ATTORNEYS

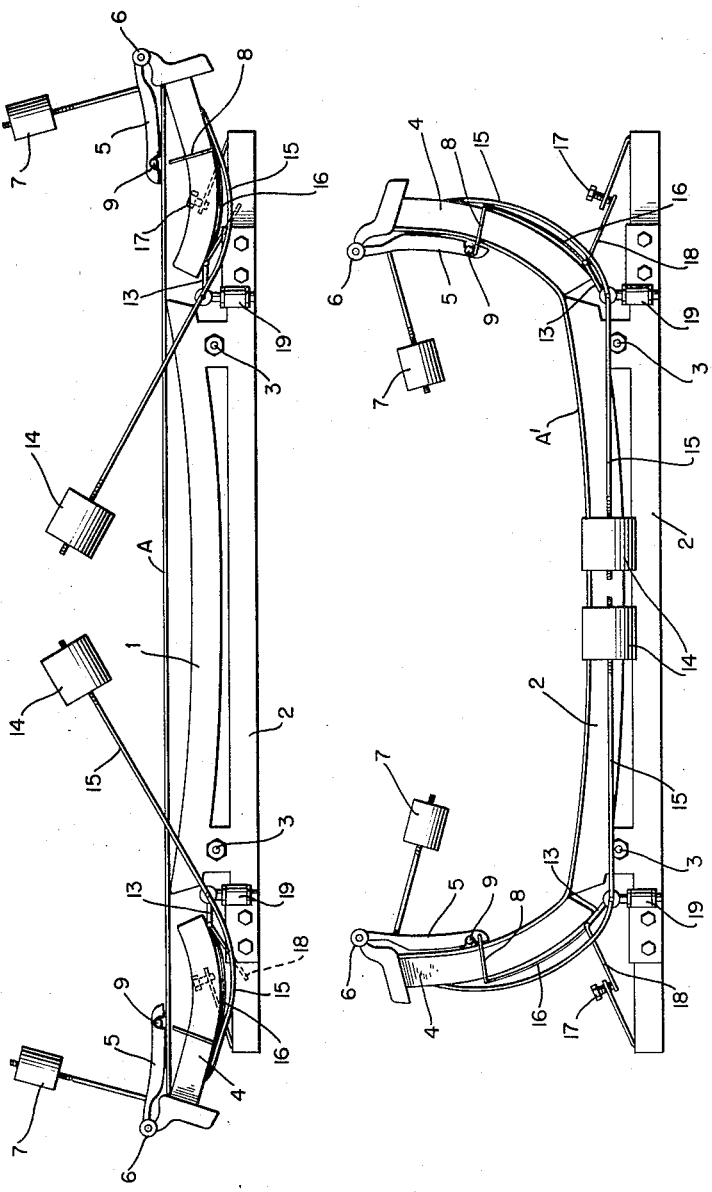

United States Patent Office 3,163,515
Patented Dec. 29, 1964

3,163,515
GLASS BENDING APPARATUS
Hubert Simons, Würselen, near Aachen, Germany, assignor to Compagnie de Saint-Gobain, Paris, France
Filed Oct. 13, 1959, Ser. No. 846,190
Claims priority, application France Oct. 15, 1958
5 Claims. (Cl. 65—289)

This invention relates to an improved method of and apparatus for bending thermoplastic sheets and in particular sheets of glass. The apparatus and method of the invention are particularly adapted, for example, for the bending of windshields and rear windows of automobiles, the central portion of such curved sheets of glass being relatively shallowly curved at the lateral portions of such sheet curved in a very pronounced manner. Such curved sheets are known, in the automotive trade, as panoramic windshields and rear windows. Typical of such bent or curved sheets of glass are so-called "wrap-around" windshields wherein the end portions make an angle of almost 90° with respect to the central portion, and wherein the radius of curvature in the joining zone of the two end portions is small, of the order of 10 cm., for example.

It is difficult to produce acceptable curved pieces of glass of the type above indicated by allowing it to sag under the softening effect of heat upon suitably curved molds or forms. In such methods, the sheet of glass is disposed horizontally upon the curved form. The sheet of glass is heated to its softening temperature as by being charged into a furnace, so that said glass sheet progressively sags downwardly upon the curved form. Efforts have been made to accelerate such bending operation by subjecting the sheet of glass to longitudinal force by means of appropriate devices. Such longitudinal force, however, produces a buckling of the sheet of glass such as to accentuate the curvature which it would normally assume under the action of its own weight as it sags under the softening influence of heat.

However, if a portion of the sheet is to be bent to a curvature of very small radius, for example of the order cited above, the prior methods of bending usually require an intense reheating of the central zone of the sheet to bring it to the desired shallowly shaped curvature but they give way to the inconvenience known as double curvature and are expensive, and time-consuming.

The bending forms employed are usually not complete throughout their entire extent, but are merely in the nature of frameworks in order to minimize the area of the form subjected to deteriorating contact with the glass. If the sheet of glass is heated to too high a temperature, or if the bending operation takes too great a time, the sheet of glass is very likely to collapse in a direction perpendicular to the plane of the curvature sought. Such collapse cannot exceed more than a few millimeters without ruining the optical qualities of the glass; a collapse of more than such allowable amount causes the glass to act like a spherical dome with the resulting distortion of the images transmitted therethrough.

Further, when the lateral parts of the sheet of glass being bent arrive at their final position, they have the tendency to collapse, under the effect of their own weight, toward the central part of the bending form.

The apparatus according to the present invention allows sharply bent glass sheets such as windshields and rear windows of automobiles to be produced by bending under gravity. Such apparatus produces bent sheets which are not subject to any of the difficulties outlined above. Such apparatus includes a bending form having a fixed central portion and two end portions which are mounted to oscillate with respect to the fixed central portions. In the preferred embodiment of the apparatus shown, there are employed two presser devices which cooperate with the end portions of the form to exert a pressure upon the sheet of glass in order to apply the sheet on an appreciable length of end portions of the form, whereby to hold the glass until it cools. In the drawings accompanying the specification and forming a portion thereof there is shown a preferred embodiment of apparatus in accordance with the invention. It is to be understood that such embodiment is illustrative only.

In the drawings:

FIG. 1 is a view in perspective of the right hand end portion of the bending apparatus of the illustrative embodiment;

FIG. 2 is a view in elevation of such apparatus showing a glass sheet mounted thereon at the beginning of a sheet-bending operation;

FIG. 3 is a view in side elevation of the apparatus showing the position of the parts at the end of the sheet-bending operation;

FIG. 4 is a view in vertical section through a bearing means pivotally mounting an end portion of the form, the section being taken parallel to the longitudinal axis of the form; and FIG. 5 is a fragmentary view in end elevation of such bearing element.

The illustrative glass-bending form of the invention has a central fixed portion 1 made up of two metal pieces having curved upper faces with the shape desired in the finally bent central portion of the glass. The two metal side pieces 1 are affixed to a chassis made up of flanged bars 2, secured together by two cross rods of which one is shown at 3. The ends of the cross rods are threaded and are attached to the members 1 by nuts on the rod disposed inwardly and outwardly of the members. The end or lateral portions 4 of the bending form are mounted for pivotal movement about horizontal axes in such manner that they may move between two positions. In the first of such positions, shown in FIG. 2, portions 4 of the form lie generally beneath the horizontal plane of the unbent glass sheet A, the ends of sheet A resting upon the extremity of each portion 4. The other of such positions is shown in FIG. 3, wherein the portions 4 are elevated in their final position to form prolongations of the central part of the form.

A presser member 5 is pivotally mounted on a link 6 provided at the end of each lateral portion of the bending-organ. The form of the presser member is adapted to be superimposed on the lateral portion. Each presser member is made of two steel-plate wings jointed together by an horizontal cross rod 9 that projects outside the two wings and rests on two supports 8 secured to the lateral portion 4. When the cross rod 9 rests on the support 8 the lower end of the wings of the presser member is at a distance from the lateral portion 4 approximately equal to the thickness of the glass sheet being bent. A weight 7 secured to the joining point of wings 5 forces constantly downwardly this presser member.

The length of the wings 5 naturally depends upon the shape of the glass sheet being bent, and upon the location of its zone of maximum curvature with respect to the ends of the glass sheet. In the embodiment shown, the length of the wings 5 is slightly less than one-half the length of each end portion 4 of the bending form.

In order that the apparatus may operate without difficulty, it is necessary that the movement of the end portions 4 of the form shall be such as not to produce any appreciable sliding of the mold and the glass sheet with respect to each other. The distance between the ends of the bending form must be equal, in the open position thereof shown in FIG. 2, to the total length of the sheet before it is bent. In the closed position of the mold, shown in FIG. 3, the distance between the ends of the form must be equal to the distance between the ends of the bent sheet.

In the embodiment of bending form shown these conditions are attained in the following manner. Two half-bearings 10 are affixed, one on each side of the form, on the chassis 2 adjacent the end of the central portion of the form. The longitudinal axis of half-bearings 10 is perpendicular to the longitudinal axis of end member 4 and located in the vertical plane of the junction between the fixed central part 1 of the glass bending form and the lateral portion 4 thereof. The axis of half-bearings is, as shown, located somewhat below the junction between such parts of the form. The position of the axis is vertically adjustable, by means of a threaded rod 11 supporting the bearing and threadedly received in an enlargement 19 of a fitting secured to the chassis 2, as shown in FIGS. 4 and 5.

A rod 12 in the form of a crankpin rests on the bearings by two surfaces while its offset portion 13 is secured to the wings 4. Two weights 14 are adjustably mounted upon the centrally directed ends of two rods 15 which are secured intermediate their lengths to the ends of the respective crank pins 12. The outer ends of the rods 15 are affixed to the wing or lateral end portion 4 by a cross rod (not shown) similar to rod 13. Such mounting and manner of moving of the lateral portion 4 of the form assures an optimum transmission of forces thereto, as well as bracing it to produce a rigid structure. In order further ot strengthen the portion 4 there are provided reinforcing members 16 which extend from and are attached to the rod 13 and the main side members of portion 4 intermediate the length thereof.

The weights 14 constantly exert a form-closing force upon the lateral end portions of the form. Such form-closed position is determined by engagement between a central abutment plate 18 affixed to rod 13 and the lower end of an abutment stud 17 adjustably mounted on the chassis 2. It will be seen that when the weights 14 are raised the lateral portions 4 of the bending form are opened to the position of FIG. 2, in which the distance between the extremities of portions 4 is increased. The means above described for moving the portions 4 of the form is satisfactory in most instances. The lateral end portions of the bending form may, however, be adjusted during their displacement by sliding guide means, or it may be driven by a dynamic or moving guiding means so that its center of rotation constantly moves during the glass-bending operation.

The preferred embodiment of glass-bending apparatus shown in the drawings and above described functions as follows. A sheet of glass A, cut to the desired shape, is placed horizontally upon the apparatus in the position shown in FIG. 2, but with the presser members 5 initially swung to open position. Following this, the presser members 5 are swung into the holding positions thereof shown in FIG. 2 wherein they stably remain under the effect of the respective weight 7. A sheet of glass is thus mounted and maintained between jaws constituted by the presser members 5 and the lateral portions 4 of the bending form. The weights 14 act upon the lateral portions 4 of the form to apply them to the end of a glass sheet. Because of its initial rigidity, the glass sheet maintains the portions 4 of the form in open position.

The glass-bending form with the sheet of glass A mounted thereon as described is then charged into a heating furnace wherein the glass sheet is progressively brought up to its softening temperature. Such heating, which may be either uniform or localized, may be produced by any appropriate means such as, for example, gas burners, reflectors, or radiant plates. As the sheet of glass becomes progressively more plastic it sinks or collapses upon the fixed central portion 1 of the form. At the same time the lateral portions 4 of the form are progressively raised toward their closed position (FIG. 3) by the weights 14. The presser members 5 are themselves closed by the action of weights 7. At its terminal position, determined by engagement between members 8 and 9, each of the presser members 5 grips its respective end of the glass sheet and thus prevents such ends from slumping inwardly. It will be seen that the bending of the central part of the glass sheet is carried out in a known manner by gravity. The extremities of the sheet are raised from their initial position and are bent upwardly by the concurrent action of gravity and mechanical force which subject the ends of the glass sheet to permanent gripping pressure. Such gripping pressure prevents the sheet from slumping or collapsing, even if the angle between the central portion of the sheet and the end portions thereof lie in the vicinity of a right angle.

It will be understood that the described glass-bending apparatus may be provided with known means for guiding the glass sheet laterally and may be provided with means for initially positioning the intermediate part thereof. For the purpose of clarity of illustration, such known means are not shown in the drawings. It is to be understood that portions of the bending mold may, as is well known in the art, be perforated when desirable to permit the better removal of heat therefrom.

Although only one embodiment of the invention has been illustrated in the accompanying drawings, it is to be expressly understood that various changes may be made therein without departing from the spirit and scope of the invention as will now be apparent to those skilled in the art.

What is claimed is:

1. Apparatus for bending sheet glass comprising an upwardly facing bending form having a fixed central portion and two end bending portions, the central and end portions of the form being concave upwardly, means mounting the two end portions so as to pivot upwardly with respect to said central portion from a position below a flat glass sheet supported on the central portion, means to bias said end portions upwardly when the sheet, disposed to overlie the central and end portions of the bending form, is heated to its softening temperature, presser means spaced apart from and extending over a substantial portion of the respective end portions of said bending form, and means to bias each said presser means toward said form end portions whereby when said sheet is heated to its softening temperature it is pressed against said bending form end portions.

2. Apparatus for bending sheet glass comprising an upwardly facing bending form having a fixed central portion and two end bending portions, the central and end portions of the form being concave upwardly, means mounting the two end portions so as to pivot upwardly with respect to said central portion from a position below a flat glass sheet supported on the central portion, means to bias said end portions upwardly when the sheet, disposed to overlie the central and end portions of the bending form, is heated to its softening temperature, presser means mounted so as to pivot downwardly with respect to said end portions from a position above a flat glass sheet supported on the central portion, and means to bias said presser means downwardly toward said end portions when said sheet is heated to its softening temperature.

3. Apparatus as defined in claim 2 wherein each presser means comprises a frame pivotally mounted to a respective end portion, said presser biasing means comprising a weight attached thereto to urge said frame toward said end portion, each of said frames having edges generally overlying and similar in shape to the glass engaging edges of the respective end portions, each frame being movable about the said end portion of the bending form so as to be able to exert a pressure upon the sheet of glass during the bending operation over an appreciable length of the ends of the sheet and being movable to approach a terminal of substantial parallelism at a distance substantially corresponding to the thickness of the sheet of glass with the glass engaging edges of the end portion of the bending form whereby the frame does not pinch the glass sheet between itself and the respective end of the bending form, and abutments to maintain the frame in said terminal position at the end of the bending operation.

4. Apparatus as defined in claim 2 wherein the end-shaping portions are capable of being swung upwards relative to the central shaping portion from a first position which corresponds to the initial shape of the sheet to a second position which corresponds to the final shape of the sheet, and comprising means for constantly urging the end-shaping portions to move toward said second position.

5. Apparatus as defined in claim 2 in which the two end portions are pivotally connected to the central portion of the bending form by transverse shafts, in which the shafts are crank shaped, and include at least one crank arm, and comprising a stop on the crank arm and an abutment secured to the central portion of the bending form, whereby to limit the extent of pivotal movement of the two end portions with respect to the central portion of the bending form.

References Cited in the file of this patent

UNITED STATES PATENTS

| | | |
|---|---|---|
| 682,570 | Sage | Sept. 10, 1901 |
| 2,003,383 | Miller | June 4, 1935 |
| 2,518,951 | Smith | Aug. 15, 1950 |
| 2,901,866 | McKelvey et al. | Sept. 1, 1959 |

FOREIGN PATENTS

| | | |
|---|---|---|
| 1,172,363 | France | Oct. 13, 1958 |
| 1,035,870 | Germany | Aug. 7, 1958 |